G. D. BAILEY.
RELEASING CLUTCH.
APPLICATION FILED JULY 27, 1912.
1,164,627.
Patented Dec. 21, 1915.
2 SHEETS—SHEET 1.
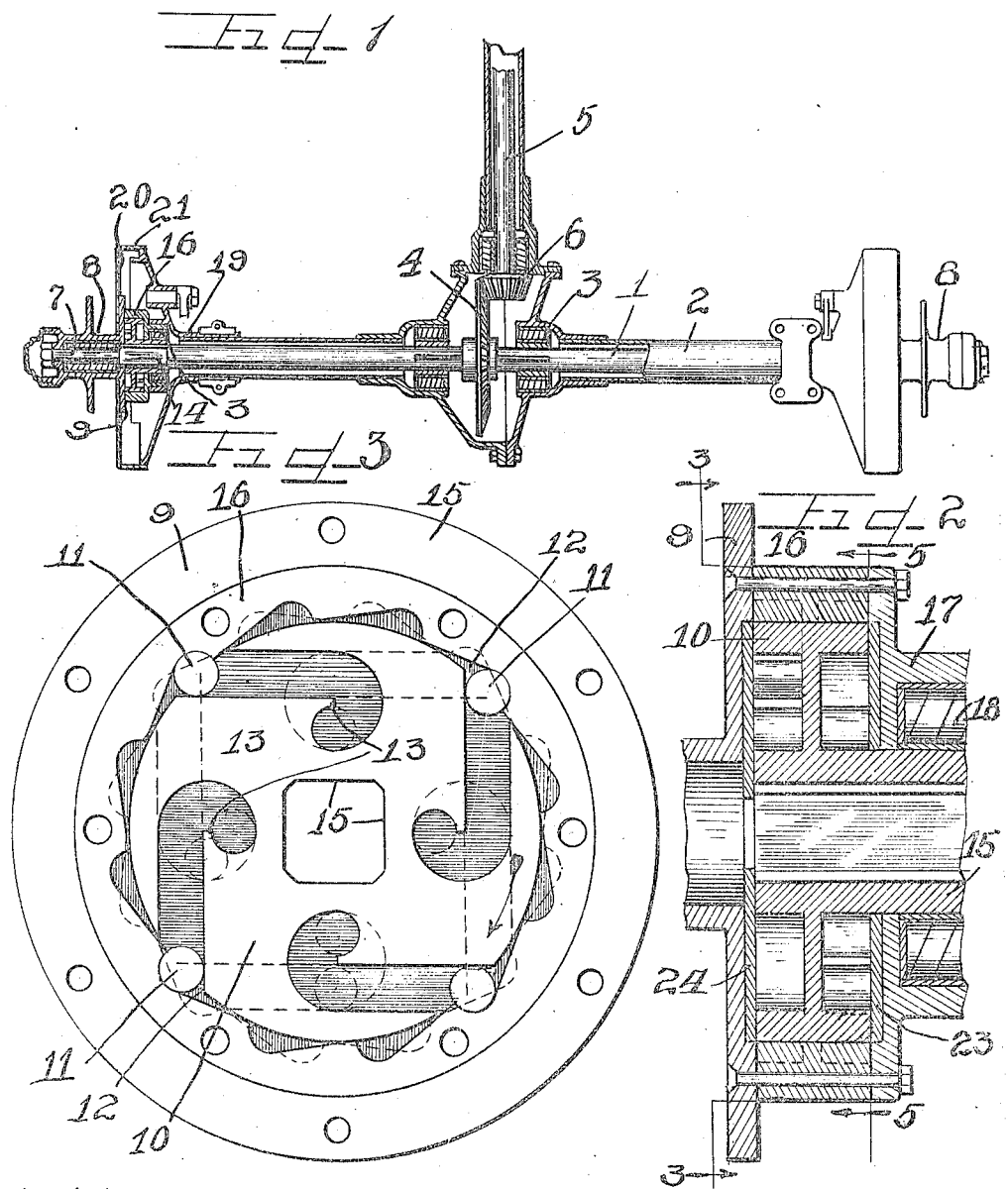

G. D. BAILEY.
RELEASING CLUTCH.
APPLICATION FILED JULY 27, 1912.
1,164,627.
Patented Dec. 21, 1915.
2 SHEETS—SHEET 2.
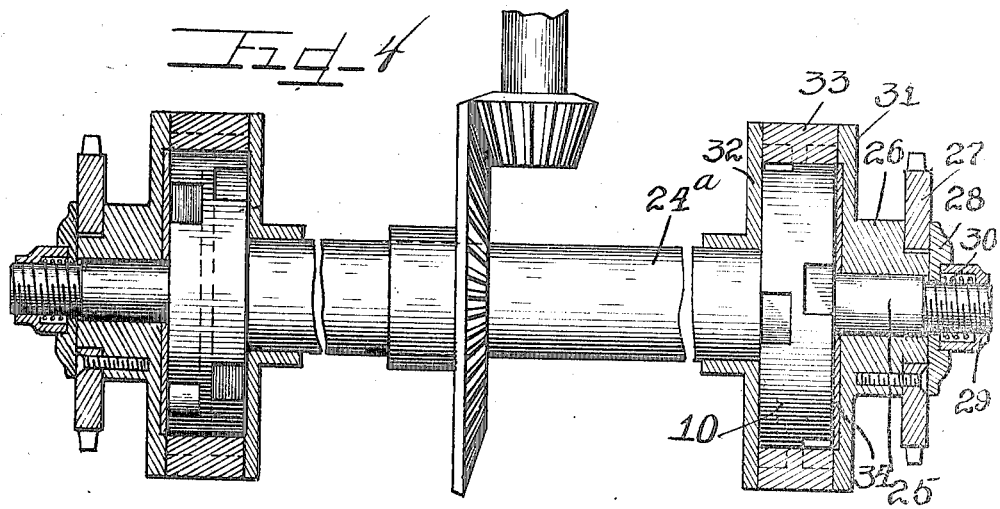
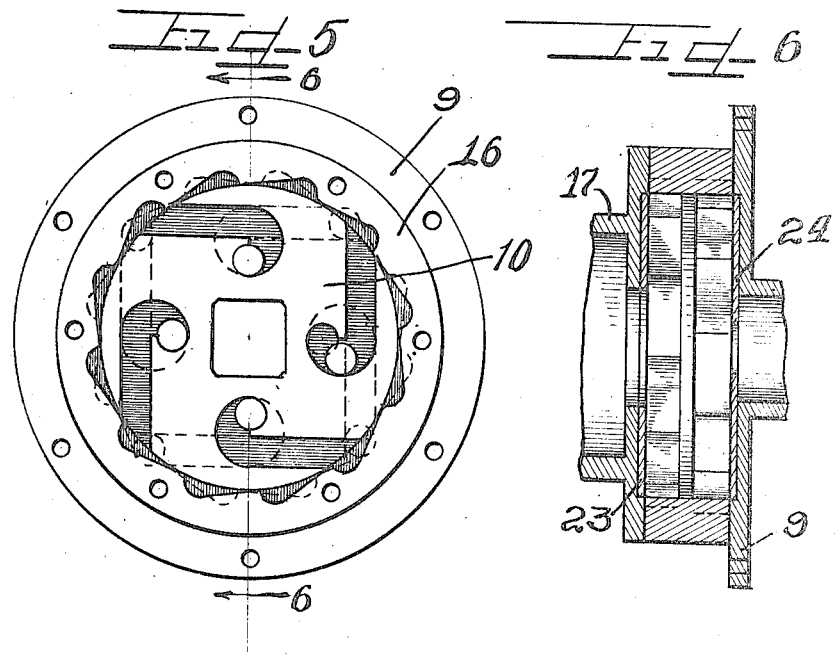

UNITED STATES PATENT OFFICE.

GEORGE D. BAILEY, OF DETROIT, MICHIGAN, ASSIGNOR TO GEARLESS DIFFERENTIAL CO., OF DETROIT, MICHIGAN.

RELEASING-CLUTCH.

1,164,627.  Specification of Letters Patent.  Patented Dec. 21, 1915.

Application filed July 27, 1912.  Serial No. 711,801.

*To all whom it may concern:*

Be it known that I, GEORGE D. BAILEY, a citizen of the United States, and a resident of the city of Detroit, in the county of Wayne and State of Michigan, have invented certain new and useful Improvements in Releasing-Clutches; and I do hereby declare that the following is a full, clear, and exact description of the same, reference being had to the accompanying drawings, and to the numbers of reference marked thereon, which form a part of this specification.

One of the most frequent causes of accident in the use of automobiles or self-propelled vehicles of any kind, is occasioned through the defective drive resulting from the use of a geared differential as heretofore used. Such differentials, for example, the differential ordinarily used on the jack shaft or rear axle for propelling automobiles, are so constructed that the drive is imparted equally to the rear wheels, and in consequence, when one drive wheel meets lesser frictional resistance than the other, as when one wheel runs upon loose sand or soft ground where it has practically no traction, the wheel upon the firm ground having greater frictional resistance and being in position to drive the car ahead, receives only the amount of motive power as is required to spin the free wheel in the soft ground; hence, the car cannot be driven ahead under its own power, the power being lost in the velocity of the least resisted wheel, also skidding sometimes occurs on wet pavements, grass, or any surface permitting the driving wheels to exert different tractive or propelling effort upon the road. So too in running at any considerable speed, the side sway of the car or vehicle becomes more noticeable and unpleasant. This is occasioned by the rear wheels alternately taking the drive dependent upon the slight speed variations between the same, due to the action of the differential itself. Each such side swaying movement may develop into a dangerous skid, should one of the driving wheels be upon mud, grass, wet asphalt, or any surface having a materially less frictional resistance to the wheel than the surface upon which the other wheel is traveling. The sudden application of the brakes frequently results in side sluing on account of the unequal action of the brakes on the wheels. In fact, with the geared differentials heretofore used, danger of serious accident is always present through the inherent defects of such drive, and fatalities from such causes are frequent.

The object of this invention is to dispense wholly with a geared differential for use in driving vehicles of any kind, and to afford a differential drive for such vehicles wherein the vehicle is driven or propelled through the slower revolving wheel instead of the faster.

It is also an object of the invention to afford a positive drive for vehicles of the class described, whereby side sluing is rendered impossible under any conditions of drive or brake application.

It is also an object of the invention to afford a construction whereby the full tractive effort of both wheels is utilized under practically all conditions except when turning or moving on a curve; in other words, to afford a two wheel drive under all normal conditions instead of a drive such as results from the use of the geared differentials heretofore used.

It is a further object of the invention to afford a construction whereby the drive is equally effective in either direction, and the change or reversing of the drive may be effected without shock or jar to the mechanism.

The invention also has for its object a construction whereby the full strength of the axle may be retained, the drive imparted thereto through any suitable means, and whereby the drive is imparted by means of the axle positively and directly and equally to the driving wheels excepting upon turns.

The invention (in a preferred form) is illustrated in the drawings and hereinafter more fully described.

In the drawings: Figure 1 is a view partly in plan and partly in horizontal section, illustrating the application of my invention to an automobile axle. Fig. 2 is an enlarged sectional view of one of the differential clutches, showing the same removed from the axle. Fig. 3 is a section on line 3—3 of Fig. 2. Fig. 4 is a fragmentary, sectional view broken away, illustrating my invention applied to the jack shaft. Fig. 5 is a section on line 5—5 of Fig. 2. Fig. 6 is a section on line 6—6 of Fig. 5, with the cam or pawl members removed.

As shown in the drawings: 1, indicates the rotative axle, journaled in suitable housings or sleeves 2, by suitable anti-friction bearings 3. Said axle may be driven by means of a sprocket and chain, or in any suitable manner. As shown, the bevel gear 4, is rigidly keyed on the axle near its middle, and a driving shaft 5, is provided with a bevel pinion 6, meshing with said bevel gear to drive the same directly from the engine through the medium of said driving shaft. Said axle 1, is turned at its extremities 7, to receive the vehicle wheels thereon, the hub member 8, of which is shown in Fig. 1, and which may be constructed as usual, and as shown, is provided at its inner end with a flange 9. Rigidly secured on said axle at each end thereof, and facing outwardly against said hub flange, is a cam or pawl member 10. This, as shown, comprises a circular member of steel or other suitable material having oppositely directed recesses in the oppositely directed plane faces thereof to receive the movable pawl members, in this instance consisting of rollers 11, of hardened steel. Said recesses, as shown, are four in number one on each face of said cam pawl member, and as shown, are milled or otherwise formed therein and directed at right angles with each other, and open through the periphery of said cam pawl member, as shown in Figs. 3 and 5. Each of said recesses is arranged in a given face of said member intermediate the center and the periphery of said member, those on opposite sides of the center being arranged parallel and directed oppositely and sufficiently near the periphery, so that where the same open through the periphery an abrupt shoulder 12, is afforded at the inner side thereof to bear against the pawl roller 11. At their inner ends, said recesses are curved inwardly toward the center, and a projection 13, is provided directly opposite from the opening through the periphery of said cam pawl member, and acting to retain the roller inwardly and centrally when said cam pawl member is rotated reversely from its normal driving direction. The recesses in the opposite face of said cam pawl member are directed oppositely from those on the other or outer face thereof, and are otherwise the same in all particulars. Said cam pawl member may be rigidly keyed on the axle or, if preferred, the axle may be made angular, as indicated at 14, and a complementally bored sleeve 15, may be provided integrally on said cam pawl member to fit thereon and to hold said cam pawl member rigidly on the shaft or axle to prevent relative rotation thereof. One of said hardened steel rollers 11, is secured in each of said recesses on each side of the cam pawl member. In the construction illustrated in Figs. 1, 2 and 3, a housing 16, affording interior oppositely directed ratchet teeth to register with the recesses in the cam pawl member, fits over said cam pawl member, and is rigidly secured by means of bolts or otherwise, with the hub flange 9, as shown in Fig. 2. Said housing is provided on its inner side with an inwardly directed hub 17, affording a recess between the same and the sleeve 15, of the cam pawl member to receive the roller or other anti-friction bearing 18, as shown in Figs. 1 and 2. This construction permits relative movement of the housing (and consequently the wheel) and the cam pawl member.

The ratchet teeth in the interior of the housing, are formed integral therewith by milling or otherwise constructing recesses thereinto, said teeth being so constructed as to receive the roller against the face thereof, which is shaped to fit thereto and are of a height to project upwardly and partly around said rollers, as shown in Fig. 3, so that the pressure exerted upon the roller by the shoulder 12, in said recess of the cam pawl member, is directed perpendicularly to the center of the throat of the tooth engaged by the roller, so that said rollers cannot escape from such engagement except by slight reverse rotation of the shaft.

In the construction illustrated in Figs. 1, 2, and 3, a brake drum 19, is secured in a familiar manner on the axle sleeve and projects over said housing and may contain any suitable brake mechanism to engage the periphery of the housing. As shown, a disk 20, is secured on the inner face of the wheel and is of a diameter substantially coincident with the brake drum and is provided with a peripheral flange 21, which extends thereover and excludes dirt therefrom. As shown, friction members 23 and 24, respectively (which may be fiber or other suitable material) are engaged in suitable recesses in the housing and in the inner face of the flange 9, respectively, to bear against the respective faces of the cam pawl member frictionally to a sufficient extent to slightly resist relative movement between the housing and cam pawl member. The rollers 11, however, are not engaged thereby, and are free to move centrifugally, as well as by gravity, in the respective recesses, dependent upon the direction of rotation of the axle, to bring the respective rollers into the proper engagement, dependent upon the direction of rotation of the axle.

In the construction illustrated in Figs. 4, 5, and 6, the jack or cross shaft 24ª, is constructed as usual, and is turned on each end 25, thereof, to receive a collar 26, on the outer end or hub of which is secured the sprocket wheel 27, by means of a suitable key. The outer end of the shaft is threaded and fitted against the end of the hub 26, of said collar, is a bronze or other suitable bearing washer or collar 28, which is recessed on its outer face. A nut 29, is threaded on the outer end of said shaft and is recessed on its inner face to receive a spring 30, which bears against said bearing washer 28. Rigidly secured on said shaft adjacent the flange 31, of said collar 26, is the cam pawl member. This may be secured on the shaft by means of a suitable key or keys, or the shaft may be constructed to afford a flat face or faces to engage in a complemental bore in the cam pawl member. A collar 32, is rotatably mounted on the shaft 24ª, at the inner side of said cam pawl member, and projects beyond the periphery thereof, and rigidly engaged between the flanges 31 and 32, of said collars, and rigidly securing the same together, is an annular double ratchet member 33, in which the ratchets are arranged identically as shown with reference to the housing 16, for the cam pawl member 10.

As shown, a fiber or other suitable friction plate 34, is provided in the inner face of the flange 31, to bear against the outer face of the cam pawl member, so that friction may be applied thereon to resist to some extent relative movement between the housing afforded by said flanges and said ratchet member 33, and said cam pawl member. The amount of friction, of course, is dependent upon the pressure exerted by the spring 30, and dependent upon the adjustment of the nut 29.

Preferably, and as shown in Fig. 4, the cam pawl members at opposite ends of the shaft, or of the axle, are set so that the openings of the one cam pawl member are directed at forty five degrees with the corresponding openings in the cam pawl member at the other end of the shaft or axle.

The operation is as follows: In starting the machine, the first preliminary movement of the axle or shaft in rotation, for example, in the direction of the arrow indicated in Fig. 3, causes one or more of the rollers in the outer face of the cam pawl member to roll into the recesses afforded by the corresponding ratchet teeth in the housing, and at the moment of engaging therein the flat face of the inner shoulder 12, of said recess engages the roller firmly against the teeth, thereby rigidly uniting the housing and consequently the wheel with said cam pawl member and axle, and driving the car or vehicle. Obviously, one or more of said rollers may engage for each wheel, and the cam pawl members being set at forty five degrees, as before described, and there being four of said pawl recesses in each face of said cam pawl members, it follows that a very slight movement of the axle relative the housing is sufficient to bring the members into locking engagement, thereby insuring the equal drive from both wheels, and obviating shock in starting. Having once engaged the rollers which serve as pawls, they cannot by any possibility become disengaged in either wheel except by reversal of the axle or except that the particular wheel may momentarily rotate at a higher rate than the axle, and consequently, the other wheel. This can occur only when the car is passing around a turn or curve, in which instance, of course, the outer wheel travels slightly faster than the inner, and, inasmuch as the inner wheel is rigidly locked to the axle through the medium of said cam pawl members and rollers, it follows that the differential movement of the wheels under such conditions is attained by the outer wheel revolving slightly faster than the axle, the drive being effected solely by the inner or slower moving wheel. Of course, the same is true under any of those conditions of road surface where one wheel may be momentarily accelerated over the other, such acceleration immediately releasing the drive from said wheel, the drive being effected obviously through the slower moving wheel, thus the tendency to side swaying and all tendency to skidding is obviated. In the application of brakes, the same effect obtains should the brakes be applied unequally to the driving wheel (and it is impossible to apply the brakes otherwise than unequally) the drive is effected still through the slower moving wheel, and tendency to skid is obviated. In reversing, a very slight preliminary movement releases the rollers from forward driving position, as shown in Fig. 3, permitting the same to roll back into the inner ends of the recesses to be retained therein while the rollers at the opposite or inner face of each cam pawl member fall into engaging position, locking the wheels to the cam pawl members for reverse drive. When driving in either direction, the rollers for the opposite drive roll inwardly, and are engaged at the inner ends of said recesses; for example, Fig. 3, indicates the position assumed by the rollers on the outer face of the cam pawl members in driving ahead, while Fig. 5, indicates the position of the rollers (normally intended for reverse drive) at the inner face of the cam pawl members. It is evident that when once engaged in driving relation, no lost motion is possible; that in going from driving position to reverse position, owing to the arrangement and engagement of the cam pawl members on the respective ends of the shaft, but exceedingly slight—in fact, almost inappreciable—relative movement is necessary, thus reducing lost motion to a minimum.

It is to be understood, of course, that while I have shown but four recesses in each face, of each of the cam pawl members, the number may vary with the size of the construction and the power required to be delivered. It is, of course, to be understood that details of the construction may be varied. I have illustrated and described but a preferred form of my invention, although I am well aware that numerous details of construction and installation may be varied without departing from the principles of my invention. I therefore do not purpose limiting the patent granted on this application otherwise than necessitated by the prior art.

I claim as my invention:

1. A device of the class described embracing a positively driven axle or shaft, a wheel on each end thereof, and clutch members secured on said shaft and wheel respectively comprising a cam member having recesses in the side faces thereof, the recesses in one face directed oppositely to those in the other face of said cam member, and a double ratchet member having rows of oppositely directed recesses therein, pawl members carried by said cam member, said members acting to interlock to rigidly engage the wheel on the shaft when driving in either direction, and said pawl members acting to disengage when the wheel is rotated faster than the shaft.

2. In a releasing clutch of the class described a cam member having a series of oppositely directed recesses in each of the side faces thereof opening into the periphery thereof with the recesses of one face directed oppositely to those of the other face of said cam member, a ratchet member having rows of oppositely directed teeth therein, cylindrical rollers carried by said cam member, said members acting to positively and rigidly interlock through said rollers when said cam member is rotated in either direction to drive said ratchet member, and said rollers acting to disengage automatically when the ratchet member overtravels or rotates faster than the cam member.

3. In a device of the class described a cam pawl member having a series of recesses in the opposite side faces thereof, cylindrical roller members disposed in said recesses, and a housing rigidly connected to a wheel to be driven and inclosing the cam pawl member and having rows of ratchet teeth disposed adjacent one another, the teeth of one row directed oppositely to those of the adjacent row to co-act with the roller members to interlock said ratchet teeth with the cam member for either direction of rotation and with the recesses in said cam member so disposed that when the housing overtravels or rotates faster than said cam member said roller members move out of engagement with said cam member and ratchet teeth to permit relative movement between said cam member and said housing.

4. The combination with a positively driven axle of a wheel freely driven on each end thereof, a double cam pawl member rigidly secured on each end of said axle and having oppositely inclining recesses in opposite faces thereof opening through the periphery of the same, rolling members in said recesses, a housing secured to the wheel and inclosing said cam pawl member, and a double row of ratchet teeth therein having concave engaging faces to receive said rolling members, the teeth of one row directed oppositely to those of the other, said teeth and said recesses being so arranged relatively to each other that the rotation of the shaft in one direction projects one set of said rolling members into engagement between the teeth of said cam pawl members, and the other of said rolling members inwardly out of engagement while reverse rotation of the shaft releases the previously engaged rolling members and discharges the other of said rolling members outwardly into engagement between the cam pawl member and teeth.

5. A device of the class described embracing a rotative shaft, a wheel mounted to rotate on the outer end thereof, a double cam pawl member rigidly secured on each end the shaft and having in opposite faces thereof oppositely inclined recesses terminating at their inner ends in a retaining shoulder, a housing secured on the wheel and projecting over and inclosing the cam pawl member, a double row of teeth therein, the teeth of one row directed oppositely to those of the other to correspond with the recesses in the cam pawl member at the periphery thereof and having concave engaging faces, rolling members in said recesses of the cam pawl member adapted the one to engage when the shaft is rotated forwardly, the other to engage when the shaft is rotated reversely to rigidly engage the wheel on the shaft, and a friction member between the said housing and cam pawl member, acting to resist relative movement between the same.

6. In a device of the class described a cam pawl member having inwardly directed oblique recesses in each side face thereof, all of said recesses in one face directed in the same direction and oppositely to those of the other face, each recess terminating at its inner end in an inwardly curved portion affording a projection or lip between the inner end thereof and the main portion of the recess, a roller in each of said recesses adapted to roll outwardly when the cam pawl member rotates in one direction, and roll inwardly when rotated in the other, and a double ratchet member arranged peripherally around the cam pawl member and having oppositely directed ratchet teeth to engage said rollers between the same and the cam pawl member when said rollers are in their outer position.

7. In a device of the class described a double series of oppositely directed ratchet teeth, a cam pawl member having obliquely directed recesses in the side faces thereof with the respective teeth in each side face directed oppositely to those of the opposite side face, a roller disposed in each of said recesses adapted to co-act with said ratchet teeth, and each of said obliquely directed recesses hook-shaped at its inner end adapted to receive the rollers seated therein to prevent interlocking of said ratchet teeth with said cam pawl member when said ratchet teeth overtravel said cam pawl member.

8. A device of the class described embracing a driven member having inwardly directed oblique recesses in each side face thereof, the recesses in one face all directed one way and opposite to those in the other face, said recesses at their inner ends curving inwardly toward the center and reversely outwardly to afford an inner detent, a roller in each of said recesses, a double ratchet member inclosing said cam pawl member and having connecting ratchet teeth directed to receive the rollers from said recesses in position for engagement by the cam pawl member, and a friction element adjustable to resist relative movement between the cam pawl member and ratchet member.

In testimony whereof I have hereunto subscribed my name in the presence of two subscribing witnesses.

GEORGE D. BAILEY.

Witnesses:
C. W. HILLS,
LAWRENCE REIBSTEIN.